Patented Feb. 7, 1933

1,896,611

UNITED STATES PATENT OFFICE

ROY CROSS, OF KANSAS CITY, MISSOURI, ASSIGNOR TO SILICA PRODUCTS COMPANY, OF KANSAS CITY, MISSOURI, A CORPORATION OF DELAWARE

TIRE PUNCTURE PREVENTIVE

No Drawing.   Application filed July 10, 1929.   Serial No. 377,327.

This invention relates to improvements in compositions useful for preventing loss of air in pneumatic tires and for occluding perforations and for preventing leakage by reason of perforations in elastic tissues of all types. Preparations of this type have heretofore been made using gel forming organic gums of the nature of gum tragacanth and gum acacia, together with fibrous material and water. In such cases, however, the organic matter present may undergo active fermentation, with resultant formation of gas pressure causing explosions and also resulting in decomposition of fabrics or rubber with which the material comes into contact. In the present invention, no organic matter is used as a gelifying constituent, no acid is present and there is no excessive causticity. The agent that produces the gel in my invention is bentonite, either in its natural state or treated to increase its gelifying action. To this bentonite is added a sufficient amount of fibrous material, preferably, fine, long-fibered asbestos. The bentonite used is a natural material such as is found in South Dakota, Utah, Wyoming, Nevada and California and is capable of forming a highly viscous mixture or gel with 200 per cent or more of water. Some bentonite will form a gel or highly viscous mixture, particularly when specially treated, with as much as 3,000 per cent of water. The amount of bentonite used for the purpose of this invention will vary with the quality of the bentonite.

To increase the viscosity of the bentonite gel, various substances may be used, including magnesium oxide, finely ground Portland cement, blast furnace slag, sodium silicate or calcium silicate in any form. A typical mixture suitable for my purpose is a combination of:

|  | Parts |
|---|---|
| Bentonite | 100 |
| Magnesium oxide | 2 |
| Asbestos fiber | 50 |

A mixture of 150 grams of this material and approximately two quarts of water is sufficient to thoroughly coat the inside of an inner tube. Obviously the exact formula will vary greatly according to the particular quality of the bentonite and the asbestos available. If pure water is not available, it is desirable to put into the mixture a trace not exceeding 0.1 per cent of a preservative such as salicylic acid or benzoic acid to prevent the tendency for the decomposition of any fermentable organic matter that might be carried by the rubber or be in the water. The amount of magnesium oxide also varies according to the special reactivity of magnesium oxide with the bentonite used.

In one ordinary method of use, a dry composition such as that stated is placed in the inner tube lining the casing of the automobile tire by removing the valve. The valve is then replaced and water is put in through the valve itself, the inside of the valve having been taken out. The threads of the valve are now thoroughly cleansed and the valve inside is replaced. Practically any size of puncture, even such as those made by large nails will cause a viscous mixture containing the asbestos fiber to flow into the aperture produced, the air pressure behind it forcing the material into the hole, thus promptly preventing leakage of any air. The most convenient method of use is to make up the entire mixture in liquid or gel form. This mixture is then forced into the tube.

I claim:

1. Tire puncture preventive containing bentonite, magnesium oxide and asbestos fiber.

2. A tire puncture preventive comprising asbestos fiber, bentonite and a viscosity promoting agent selected from a group consisting of magnesium oxide, Portland cement, blast furnace slag, sodium silicate and calcium silicate.

3. A tire puncture preventive comprising the following ingredients in approximately the proportions by weight of, bentonite 100 parts, magnesium oxide 2 parts, asbestos fiber 50 parts.

In testimony whereof, I have hereunto affixed my signature.

ROY CROSS.